US006131022A

United States Patent [19]

Jacomb-Hood et al.

[11] Patent Number: 6,131,022

[45] Date of Patent: Oct. 10, 2000

[54] TRANSCEIVER AND ANTENNA SYSTEM FOR COMMUNICATION WITH REMOTE STATION

[75] Inventors: Anthony Wykeham Jacomb-Hood, North Syracuse; Jacqueline Jan Berkebile, Baldwinsville; Abdelaziz Benalla, Syracuse, all of N.Y.

[73] Assignee: Martin Marietta Corporation, Syracuse, N.Y.

[21] Appl. No.: 08/267,972

[22] Filed: Jun. 29, 1994

[51] Int. Cl.[7] .......... H04B 1/38

[52] U.S. Cl. .......... 455/276.1; 455/277.1; 455/101

[58] Field of Search .......... 455/269, 272, 455/273, 275, 276.1, 277.1, 277.2, 278.1, 73, 91, 101, 562; 375/267, 347, 349; 343/907

[56] References Cited

U.S. PATENT DOCUMENTS

| | | | |
|---|---|---|---|
| 2,786,133 | 3/1957 | Dyke | 455/272 |
| 2,951,152 | 2/1958 | Sichak et al. | 455/273 |
| 5,345,603 | 9/1994 | Laffont | 455/276.1 |

FOREIGN PATENT DOCUMENTS

| | | | |
|---|---|---|---|
| 0248124 | 10/1990 | Japan | 455/276.1 |
| 2251360 | 7/1992 | United Kingdom | 455/276.1 |

OTHER PUBLICATIONS

Dr. C.C. Kilqus; Spacecraft and Ground Station Applications of the Resonant Quadrifilar Helix; 1974 IEEE International Conference; pp. 75–77.

C.C. Kilgus; Resonant Quadrifilar Helix Design; The Microwave Journal, Dec. 1970; pp. 49–54.

*Primary Examiner*—Thanh Cong Le
*Attorney, Agent, or Firm*—Swidler Berlin Shereff Friedman LLP

[57] ABSTRACT

In one aspect of the present invention, a transceiver includes a pair of antennas with one of the receive channels including a predetermined phase shifter for shifting one of the received signals prior to combining the received electromagnetic energy to form a combined signal for processing by a receiver. The amount of phase shift may be set to maximize the combined signal. The transceiver accounts for signal fading resulting from multiple path reflection, and is especially beneficial in a hand-held or mobile unit. In another aspect, an antenna system includes a pair of elongated quadrifilar antennas, which may be disposed so as to have their longitudinal axes parallel or coincidental as desired. A method for maximizing receipt of electromagnetic energy is also described along with a detector useful for determining the presence of information associated with electromagnetic energy.

11 Claims, 3 Drawing Sheets

TRANSCEIVER AND ANTENNA SYSTEM FOR COMMUNICATION WITH REMOTE STATION

BACKGROUND OF THE INVENTION

This invention relates to a transceiver for communication with a remote station, and, more particularly, to a transceiver which determines an optimal operation mode for such communication and to an antenna system which may be used with such transceiver.

For communication with certain remote stations, a portable and/or mobile transmitter and receiver, or a combination thereof commonly referred to as a transceiver, may be used. A portable transceiver may include a hand-held unit which contains all required transmitter, receiver and antenna components to operate as a stand-alone transmitter of electromagnetic energy to the remote station, and receiver of electromagnetic energy from the remote station, such as a satellite. Generally the electromagnetic energy is intentionally perturbated or modulated in some fashion, for example, by amplitude modulation, frequency modulation, frequency shift keying, or some combination thereof, for facilitating information exchange between the local station and the remote station.

In operation, and especially if moving during operation, a local station mobile transceiver such as may be used in conjunction with a land-based vehicle like a car, train or tank, or an air-based vehicle like an aeroplane, helicopter or jet, or a water-based vehicle like a boat or ship, and especially a portable transceiver that is held in the hand of an operator during operation, will change the orientation of the transmit and/or receive antenna with respect to the respective receive and/or transmit antenna at the remote station. Further, movement of the local transceiver within the local environment, will cause random effects or perturbations, such as reflection and scattering, to affect communication between the local and remote stations due to changes in electromagnetic reflectivity properties of the local environment, both natural e.g., trees, fields, bodies of water, and cultural e.g., buildings, roads, in the vicinity of the transceiver. Even without such movement, local phenomena may sporadically and non-uniformly affect the communication. Such changes in orientation of antennas and/or perturbations are generally manifested in an alteration in the direction of polarization of the transmission and/or reception which ultimately may result in a decrease in detected signal strength along with an attendant increase in the signal to noise ratio.

Multipath fading due to received energy reaching the receiver via a direct path between local and remote stations as well as over a reflected or indirect path emanating, for example, from scattering surfaces including the earth degrades the quality of communication between the local and remote station. For example, the direct and reflected waves of energy arriving at the receiver interfere with each other and instantaneously either reinforce, or add, or detract, or subtract, from each other to form the resultant received energy signal available for processing. Long time interval effects may include changing degrees of such addition and subtraction in a periodic or aperiodic manner, which may be manifested, for example, by additional apparent modulation, such as warbling.

In an existing system, two antennas, each having the same bandwidth are associated with a portable unit. Upon receipt of a test signal from a remote station, electronics associated with the portable unit select the antenna having the higher output to use as the receive antenna during a subsequent communication interval until a next test-tone cycle from the remote station is processed.

SUMMARY OF THE INVENTION

In accordance with the present invention, a transceiver comprises transmitter means for supplying a first electromagnetic energy signal, a receiver for obtaining communication information associated with a second electromagnetic signal, first antenna means for intercepting a first portion of the second electromagnetic energy signal for forming a first receive signal and for broadcasting a first portion of the first electromagnetic energy signal, phase shifting means, phase control means having an output connected to the input of the phase shifting means, second antenna means for intercepting a second portion of the second magnetic energy signal for forming a second receive signal and for broadcasting a second portion of the first electromagnetic energy signal and combiner/divider means in a first mode of operation, such as transmitting, for directing a first part of electromagnetic energy available at a third port connected to the output of the transmitter and input of the receiver to a first port connected to the first antenna means, and a second part of electromagnetic energy available at the third port to a second port connected to a second port of the phase shifting means, and in a second mode of operation, such as receiving, for combining electromagnetic energy at the first and second port for forming a combined electromagnetic energy signal that is available at the third port.

The phase shifting means are useful for applying a first predetermined phase shift to the second receive signal for forming a phase-shifted receive signal that is available at the second port of the phase-shifting means. The input of the phase control means is connected to the third port of the divider/combiner means for generating a phase control signal in response to the magnitude of the combined electromagnetic energy signal, wherein the first predetermined phase shift is in response to the phase control signal.

The phase control means may include peak detector means for generating a peak detect signal indicative of the magnitude of the combined electromagnetic energy signal, wherein the magnitude of the combined electromagnetic signal may be maximized in response to the phase control signal. The phase control means may also or alternatively include state selector means for commanding application of each of a plurality of second predetermined phase shifts in a predetermined sequence, wherein the one of the plurality of second predetermined phase shifts obtaining a maximum combined electromagnetic signal is selected as the predetermined phase shift. The commanding may be performed in response to a tone signal associated with the second electromagnetic energy signal.

In an other aspect of the present invention, an antenna system comprises a first and a second elongated quadrifiliar helix antenna having first and second longitudinal axes, respectively, wherein the first and second antenna are disposed so that the first and second axes are substantially parallel to each other. The system may include dielectric means disposed between and abutting the first and second antenna such that an extension of the first and second longitudinal axis passes through the dielectric means and wherein the dielectric means for supporting the first and second antenna in a fixed mutual relationship. The first and second axes may be colinear.

The dielectric means may extend such that the midpoints of the first and second axes are spaced from each other a distance D, wherein D is a predetermined portion of the wavelength $\lambda$ of electromagnetic energy designated to be transmitted or received by the antenna system. Distance D may be equal to or less than the wavelength $\lambda_o$ of the designated transmitted or received electromagnetic energy having the higher frequency and may lie in the range of about 50% of $\lambda_o$ to about 100% of $\lambda_o$.

In yet another aspect of the present invention, a method for maximizing receipt of electromagnetic energy comprises intercepting a first and a second predetermined portion of the electromagnetic energy for forming a first and a second received signal, respectively, shifting the phase of the second received signal for generating a phase shifted signal, combining the first received signal with the phase shifted signal for generating a detection signal and setting the amount of phase by which the second received signal is shifted such that the amplitude of the detection signal is maximized. The phase of the second received signal may be shifted in a plurality of discrete steps with the phase ultimately set to the amount of phase corresponding to the discrete value which maximizes the amplitude of the detection signal. The step of setting may be performed in response to a tone signal that is supplied by a remote source, wherein the detection signal is indicative of the tone signal and the remote source also provides the electromagnetic energy. The electromagnetic energy may include communication energy associated therewith so that the detection signal may be supplied to receiver means for obtaining the communication information from the detector signal.

In still another aspect of the present invention, a detector for generating a detection signal useful for determining presence of information associated with electromagnetic energy comprises first and second antenna means for intercepting a respective first and second portion of an electromagnetic energy signal for forming respective first and second receive signals available at a respective port of the antenna means, phase shifting means for generating a phase shifted signal responsive to the second receive signal and in response to a phase control signal, combiner means for forming the detection signal in response to a predetermined combination of the first receive signal and the phase shifted signal, and phase control means for generating the phase control signal in response to the magnitude of the detection signal, wherein the magnitude of the detection signal can be maximized in response to the phase control signal. The phase control signal may obtain a predetermined one of a plurality of predetermined discrete values. The predetermined combination may be a summation such that the detection signal reflects a difference in phase between the first receive signal and the phase shifted signal. The detector may further include receiver means for generating in response to the detection signal a signal indicative of information associated with a modulation of the electromagnetic energy.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

Figure 1:
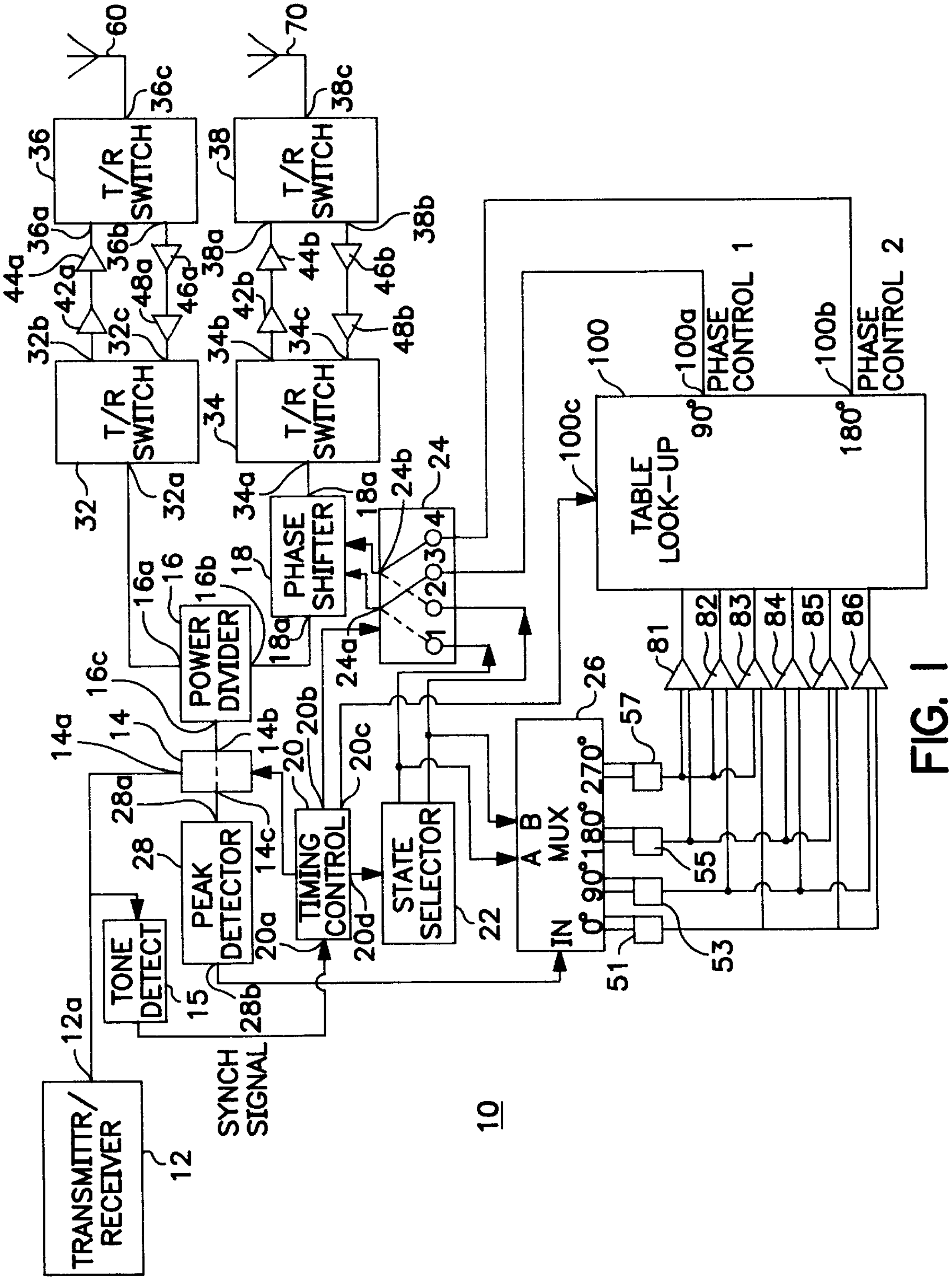
FIG. 1 is a block diagram of a transmit/receive system in accordance with the present invention.

Referring to FIG. 1, a block diagram of a transmit/receive system in accordance with the present invention is shown.

As used herein and in the discussion which follows, and especially with respect to the claims appended hereto, the term "connected" not only includes the concept of "directly physically connected" but also comprehends connection through intermediary components or apparatus as well, without need to recite or specify the intervening components or apparatus in order to define an operational configuration. Thus, by way of illustration and not of limitation, as shown in FIG. 1, transmitter/receiver 12 is shown connected to power divider 16 which in turn is shown connected to antenna 60 and 70. Of course, transmitter/receiver 12 is also illustrated as connected to antenna 60 and 70.

For placing the current invention in a possible operating environment, and without limiting the scope or generality of the invention, it will be assumed herein that system 10 is part of a hand-held earth-based (e.g., land, sea, air) communication system referred to as the "local station" and that the "remote station" of the overall communication system is satellite-based and also includes a receiver and transmitter, or transceiver. The satellite may be orbiting the earth or geostationary (i.e., at an altitude of about 22,000 miles from the earth) with respect to a predetermined site on the earth.

Communication between an earth-based station and a satellite is often controlled, at least in part, by international treaty. For example, in one particular case, the uplink, or ground-based to satellite, communication carrier frequency is assigned to be about 1.6 GHz while the downlink, or satellite to ground-based, communication carrier frequency for the same system is assigned to be about 2.5 GHz. Of course, other frequency value selections for the uplink/downlink communication paths are possible, and the invention is applicable even if the uplink and downlink frequencies are the same.

The transmitter portion of transmitter/receiver 12 generates electromagnetic or radio frequency (RF) energy with a predetermined bandwidth and having a frequency nominally centered on the desired uplink frequency. A modulator (not shown) may be connected to transceiver 12 for modulating the generated electromagnetic energy prior to transmission for imparting communication information to the generated energy as is apparent to one familiar with the art.

As depicted, transmit/receive, or communication, system 10 includes a conventional transmitter and receiver, or transceiver, shown generally at 12, a switch 14, a power divider/combiner 16, a phase shifter 18, two pairs of transmit/receive (T/R) switches, or devices, 32 and 34 and 36 and 38, amplifiers 44*a*, 44*b*, 46*a*, 46*b*, 48*a*, 48*b*, drivers 42*a* and 42*b*, and antennas 60 and 70.

Port 14*a* of switch 14, which may be an electronic, mechanical or electromechanical coaxial or microwave switch, is connected to port 12*a* of transceiver 12, while port 14*b* of switch 14 is connected to port 16*c* of power divider/combiner 16. In normal, or transmit/receive, operation port 14*a* is internally connected to port 14*b* of switch 14 by a low insertion loss path.

The term "low insertion loss path" is used herein when it is anticipated that the signal expected to travel the path is relatively high frequency, and typically an electromagnetic signal such as at RF, compared to a direct current (DC) or alternating current (AC) electrical signal. A low insertion loss path for high frequency signals is analogous to a low resistance or short circuit path for an electrical circuit.

Power divider/combiner 16 may be, for example, a nominal 3-db device as is known to one familiar with the art, and arranged so that in the divider or transmit mode the absolute value of energy available at each of ports 16*a* and 16*b* is approximately one-half that of energy available at port 16*c*. Divider/combiner 16 is generally a bilateral device so that in the combiner or receive mode, the absolute value of energy available at port 16*c* is approximately the sum of energy available at ports 16*a* and 16*b*. Device 16 may also be referred to as distributor means in recognition that it accepts energy available at its ports and distributes the energy to other ports as noted above.

Port 16*a* of device 16 is connected to port 32*a* of the T/R switch 32, whereas port 16*b* of device 16 is connected to port 18*a* of phase shifter 18 with port 18*b* of phase shifter 18 connected to port 34*a* of T/R switch 34. Phase shifter 18, such as may be available from Vectronics Microwave Corporation, Middlesex, N.J., or the like, is preferably a digital phase shifter with an appropriate number of phase bit controls for providing the desired phase resolution. As shown, phase shifter 18 is a two-bit phase shifter with respective bits therefor supplying 90° and 180° of the phase shift on an output signal in the operating band with respect to the input signal. Thus, four relative phase relationships (0°, 90°, 180° and 270°) are possible between the input and output signal through two-bit phase shifter 18. Phase shifter 18 is also desirably bilateral so that it matters not whether port 18*a* or 18*b* is designated the "input" with the other port being the "output". For a phase shifter having more bits than desired, an appropriate number of the least significant bits may be disabled so that the remaining number of active more significant bits provides the desired phase shift values. A phase shifter having more than two phase control bits wherein all phase control bits included in the circuit to affect phasing between the input and output signal of phase shifter 18 may also be employed for providing finer phase resolution. Thus, for example, for a four-bit phase shifter sixteen different discrete relative phases between the input and output signal of phase shifter 18 are possible with the smallest or least significant phase difference being 22.5°. However, recognize that the cost and complexity of system 10 will generally increase as the number of possible phase values is increased. Thus, for three stages of phase shift of phase shifter 18 additional phase shift values of 45°, 135°, 225° and 315° are possible over those available with two-stage of phase shift. In general, the least significant bit, and corresponding finest resolution, of phase shift may be represented by the expression 360° /(2n), where n is the number of stages of phase shifter 18.

Port 32*b* of T/R switch 32 is connected to port 36*a* of a T/R switch 36 through series combination of a driver 42*a* and a high power amplifier 44*a*, while port 36*b* of T/R switch 36 is connected to port 32*c* of T/R switch 32 through series combination of a low noise amplifier 46*a* and an amplifier 48*a*. Likewise, port 34*b* of T/R switch 34 is connected to port 38*a* of a T/R switch 36 through series combination of a driver 42*b* and a high power amplifier 44*b*, while port 38*b* of T/R switch 48 is connected to port 34*c* of T/R switch 34 through series combination of a low noise amplifier 46*b* and an amplifier 48*b*. Port 36*c* of T/R switch 36 is connected to antenna 60, while port 38*c* of T/R switch 38 is connected to antenna 70.

Based on the teachings presented herein, other devices such as circulators, load isolators and duplexers may be used in place of or in combination with T/R switches for protecting components of system 10 as will be recognized and appreciated by one familiar with the art.

High power amplifiers 44*a* and 44*b*, which may be of the same type, are conventional amplifiers, such as a class A power amplifier available from M/A-COM, Lowell, Mass., or a model APG-2053, available from Avantek Corporation, or the like, having an operating bandwidth centered generally on the carrier or center frequency of energy, or uplink signal, transmitted from the transmitter of transceiver 12. Drivers 42*a* and 42*b*, which are optional, are used provide additional gain in the transmit path, and may be of the same type, such as a model APG-2053, available from Avantek Corporation, or the like.

Figure 3:
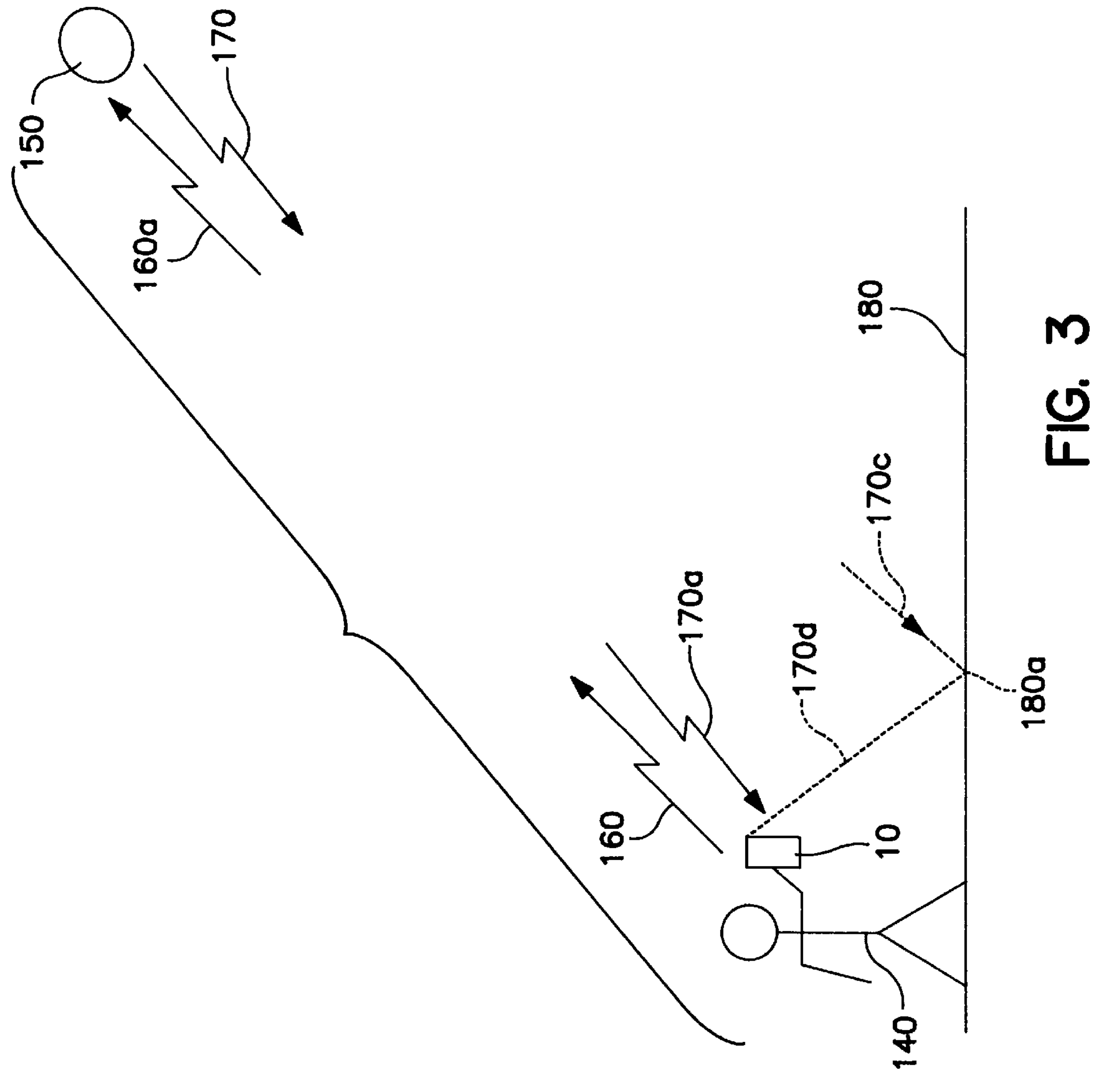
FIG. 3 is a pictorial representation of a communication environment useful for explaining operation of the present invention.

Low noise amplifiers 46*a* and 46*b* which may be of the same type, are conventional amplifiers, such as from the AFD3 series, available from MITEQ, Hauppauge, N.Y., or the like, having an operating bandwidth centered generally on the carrier or center frequency of the energy received, or downlink signal, from a remote station, like satellite 150 (FIG. 3). Additional low noise amplifiers 48*a* and 48*c*, which are optional, and if used provide additional gain in the receive path, may be the same type, such as from the AFD3 series, available from MITEQ, Hauppauge, N.Y., or the like.

T/R switches 32, 34, 36 and 38 prevent or block relatively high energy available during the transmit mode from entering receive system components, like amplifiers 46*a*, 46*b*, 48*a* and 48*b*, where potential damage, up to and including catastrophic failure, of such delicate receive system components is possible. Operation of T/R switches is well known in the art. One type of T/R switch establishes during the transmit mode a low resistance or low insertion loss path to ground or common potential at the input and/or output of receive system components so that any high energy appearing at such inputs and/or outputs is directed or shunted to the ground or a common potential before the energy can adversely affect the receiver components. The T/R switch may in addition to, or in place of the shunt path, present a high impedance to energy seeking to enter inappropriate electronic circuitry.

Antennas 60 and 70 are bilateral devices. That is, they radiate into their surroundings, typically including the atmosphere and ultimately into outer space, energy received from transceiver 12 during the transmit operation, and during the receive operation receive or intercept energy from their surroundings, which received energy that is within the receive operating band of system 10 is ultimately directed to transceiver 12 for processing. Antennas 60 and 70 are discussed in more detail in conjunction with the description of FIG. 2. If desired, three or more antennas may be analogously arranged as part of system 10 by one familiar with the art in accordance with the teachings presented herein.

Operation of the portion of system 10 that has been discussed so far will now be detailed starting with the transmit mode and then covering the receive mode.

In the transmit mode, the transmitter portion of transceiver 12 and electronic circuitry associated therewith generates energy having a desired center frequency and bandwidth as is known by one familiar with the art. The energy may be modulated using a technique such as amplitude modulation, frequency modulation, phase-shift keying or otherwise, for imparting intelligence, such as voice and/or data, to the energy to be transmitted. The operating center frequency of the transmitted energy may be selected as desired, and the current invention is not to be limited to any particular frequency or range thereof, while recognizing that there may be external constraints, such as governmental laws and regulations, and international treaties, that may supersede, dictate or limit selection of particular frequencies or bands of frequencies for use.

In a current satellite based communication system, international treaty has established a nominal value of 1.6 GHz as the uplink, or earth to satellite, operating center frequency and a nominal value of 2.5 GHz as the downlink, or satellite to earth operating center frequency, which yields a nominal uplink to downlink frequency separation of 900 MHz. Frequencies above about 30 MHz are typically referred to as radio frequency or RF.

Energy, including any modulation thereof, to be transmitted is supplied from port 12*a* of transceiver 12 to port 14*a* of switch 14. Switch 14 is configured during the transmit mode so that port 14*a* is internally connected to port 14*b* to establish a low insertion loss path therebetween. The transmit energy is supplied from port 14*b* to port 16*c* of power divider 16. Power divider 16 accepts the energy available at port 16*c* and distributes it equally so that nominally one-half the energy supplied to port 16*c* is available at each of ports 16*a* and 16*b* of power divider 16.

Energy from port 16*a* is supplied to port 32*a* of T/R switch 32. Energy from port 16*b* is provided to port 18*a* of phase shifter 18 which applies the selected phase shift to the energy available at port 18*a* and supplies the resulting phase-shifted energy to port 34*a* of T/R switch 34 from port 18*b*.

In the transmit mode, T/R switch 32 is configured to prevent energy from the transmitter of transceiver 12, and desirably at least a significant and potentially damaging portion of the energy, from arriving at port 32*c* of switch 32 from where it may enter or impinge upon amplifier 48*a*, if used, or else upon amplifier 46*a*. Likewise T/R switch 34 is configured to prevent energy from the transmitter of transceiver 12, and desirably at least a significant and potentially damaging portion of the energy, from arriving at port 34*c* of switch 34 from where it may enter or impinge upon amplifier 48*b*, if used, or else upon amplifier 46*b*. Also, T/R switches are configured in the transmit mode to prevent energy, and desirably at least a significant and potentially damaging portion of the energy, available at ports 36*a* and 38*a*, respectively, from arriving at ports 36*b* and 38*b*, respectively, from where it may enter or impinge upon amplifiers 46*a* and 48*a*, and upon amplifiers 46*b* and 48*b*, respectively.

In the transmit mode, T/R switch 32 is further arranged to direct energy from port 32*a* internally along a low insertion loss path to port 32*b* of switch 32. Further, T/R switch 34 is also arranged to direct energy from port 34*a* internally along a low insertion loss path to port 34*b* of switch 34.

Energy from port 32*b* is amplified by amplifier 44*a* when port 32*b* is directly connected to the input of amplifier 44*a* or by the combination of driver 42*a* and amplifier 44*a*, when connected through driver 42*a*, if used, whose output is shown connected directly to the input of amplifier 44*a*, so that the amplified energy from driver 42*a* is supplied to the input of amplifier 44*a* for further amplification. The amplified energy from the output of amplifier 44*a* is supplied to port 36*a* of switch 36. Likewise, energy from port 34*b* is amplified by amplifier 44*b* when port 34*b* is directly connected to the input of amplifier 44*b* or by the combination of driver 42*b* and amplifier 44*b*, when connected through driver 42*b*, if used, whose output is shown connected directly to the input of amplifier 44*b*, so that the amplified energy from driver 42*b* is supplied to the input of amplifier 44*b* for further amplification. The amplified energy from the output of amplifier 44*b* is supplied to port 38*a* of switch 38.

In the transmit mode, switches 36 and 38 provide respective low insertion loss paths between ports 36*a* and 36*c*, and ports 38*a* and 38*c*, respectively. Energy available at ports 36*c* and 38*c* are supplied to antennas 60 and 70, respectively, for broadcast or transmission, typically at least initially into the atmosphere or free space.

In the receive mode, the flow of received energy from antennas 60 and 70 to transceiver 12 is generally reversed from that of transmitted energy of the transmit mode. Energy detected or intercepted by antennas 60 and 70 is respectively provided to ports 36*c* and 38*c* of switches 36 and 38, respectively.

Switch 36 is configured so that a low insertion loss path is internally provided between port 36*c* and port 36*b* of switch 36 while a high insertion loss path or a shunt path is provided between port 36*c* and port 36*a* of switch 36. Alternatively, a low impedance shunt path may be inserted or established in parallel with the internal energy flow path between port 36*c* and port 36*a* of switch during transmission. All T/R devices may be appropriately configured to present an appropriate low and high insertion loss path, and low impedance shunt path as desired.

Energy from port 36*b* is supplied to port 32*c* of switch 32 through amplifier 46*a* and, if used, amplifier 48*a*. Switch 32 is configured so that a low insertion loss path is internally provided between port 32*c* and port 32*a* of switch 32 while a high insertion loss path or shunt path is provided between port 32*a* and port 32*b* of switch 32.

Likewise, switch 38 is configured so that a low insertion loss path is internally provided between port 38*c* and port 38*b* of switch 38 while a high insertion loss path or a shunt path is provided between port 38*c* and port 38*a* of switch 38. Energy from port 38*b* is supplied to port 34*c* of switch 34 through amplifier 46*b* and, if used, amplifier 48*b*. Switch 34 is configured so that a low insertion loss path is internally provided between port 34*c* and port 34*a* of switch 34 while a high insertion loss path or shunt path is provided between port 34*a* and port 34*b* of switch 34.

Energy from port 32*a* of switch 32 is supplied to port 16*a* of power divider 16 while energy from port 34*a* of switch 34 is provided to port 16*b* of power divider 16 through phase shifter 18. Phase shifter 18 accepts energy available at port 18*b*, applies a predetermined phase shift to it and the resulting phase shifted energy available at port 18*a* is supplied to port 16*b* of power divider 16. Power divider 16 combines the power available at ports 16*a* and 16*b*, such as by algebraic summation, and makes available the resultant power at port 16*c*. Energy from port 16*c* of power divider 16 is coupled to port 12*a* of transceiver 12 through switch 14. Switch 14 is arranged to provide a low insertion loss path between port 14*b* and 14*a* for energy available at port 14*b* during the receive mode. The receiver portion and associated circuitry of transceiver 12 extracts information from the received energy such as by demodulation for example, as is known to one familiar with the art.

Continuing with the description of FIG. 1, transmit/receive system 10 further includes tone detect circuitry 15, peak detector circuitry 28, timing control circuity 20, state selector circuitry 22, multiplexor (MUX) 26, table look-up 100 and switch 24.

Tone detect circuity 15 includes an input connected to port 12*a* of transceiver 12 for receiving a portion of the received energy. Energy to be transmitted may be prevented from entering the input of tone detect circuitry 15 by use of a T/R switch or other blocking device (not shown), as is known to one familiar with the art. The output of detect circuitry 15 is connected to input 20*a* of timing control circuitry 20. Control circuitry 20 includes a plurality of outputs designated 20*b*, 20*c* and 20*d* respectively connected to inputs of switch 24, table look-up 100 and state selector circuitry 22, respectively, for supplying respective control signals thereto. Circuitry 20 also includes an output connected to an input of switch 14 for providing a control signal to switch 14.

Peak detector 28 includes a port 28*a* connected to port 14*c* of switch 14 for obtaining the received energy from power divider 16. When it is desired or necessary to provide received energy to peak detector 28, the control signal supplied to switch 14 from timing control circuitry 20 will cause switch 14 to configure itself so that port 14*b* is internally connected to port 14*c* over a low insertion loss path while the path internal to switch 14 between port 14*b* and 14*a* is interrupted, disconnected or shunted to produce a high insertyion loss path.

The duty cycle for direct connector between port 14*b* and 14*c* versus direct connection between port 14*b* and port 14*a* over a predetermined time interval will be substantially shorter, say by greater than an order of magnitude (i.e., ten times), and more likely several orders of magnitude, for example three. The duty cycle in this case may be considered as the inverse of the sum of time of connection of port 14*b* to port 14*c* during the predetermined interval divided by the time length of the same predetermined interval. If the internal connections between ports 14*a*, 14*b* and 14*c* of switch 14 change at regular or periodic intervals, then the predetermined interval may conveniently be taken as the length in time of one complete period of such internal switch changes.

The output of tone detect circuitry 15 is connected to input 20*a* of timing control circuitry 20 for supplying a synchronization (synch) signal thereto. Tone detect circuitry monitors or "listens" to the received energy for identification of a predetermined tone, such as a modulation pattern, code, or sequence of data bits. The tone may be at the same frequency as the primary communication traffic or at a different frequency that is still able to pass through system 10 from the antennas to tone detector circuitry 15. Tone detect circuitry 15 may be additionally sensitized to a tone at a different frequency by conditioning the received signal by a narrow-band filter or filter network (not shown), which is generally centered on the center frequency of the expected tone frequency, and then applying the conditioned signal to tone detect circuitry 15 for actual tone detection as will be apparent to one familiar in the art. In response to the tone, peak detect circuitry 28 causes a change in the synch signal which change is received and recognized by timing control circuitry 20 as the beginning of a test or tone cycle, which cycle is described in more detail below. Such change in the synch signal may be, manifested, for example, by a shift from one voltage level or digital state to another voltage level or digital state.

Alternatively, a predetermined communication scheme, such as Time Division Multiple Access (TDMA), may be employed between the local and remote station. This scheme along with other suitable communications schemes are described in "Multiaccess Protocols in Packet Communication Systems"—Fouad Tobagi, IEEE Transactions on Communications (April 1980). When a TDMA system is used, for example, a predetermined time slot may be assigned to the local station during which testing for determining the optimal phase setting of phase shifter 18 as described below may be initiated.

Output 28*b* of peak detector 28 is connected to an input of MUX 26 which also constitutes the IN port of MUX 26. The magnitude of the value of the signal available from output 28*b* of peak detector 28 is indicative of the instantaneous peak power of the received energy provided to port 28*a* of detector 28. One output of state selector circuitry 22 is connected to an input designated A of MUX 26 and to terminal 1 of mode select switch 24. The other output of state selector circuitry 22 is connected to an input designated B of MUX 26 and to terminal 2 of mode select switch 24.

In response to the control signal supplied from output 20*d* of timing control circuitry 20, state selector circuitry 22 provides a pair of output signals that are supplied to MUX 26 and switch 24. Another control signal supplied from output 20*b* of timing control circuitry 20 to switch 24 causes switch 24 to be internally arranged so that terminal 1 is connected to port 24*a* and terminal 2 is connected to port 24*b*, and so that terminal 3 is disconnected from port 24*a* and terminal 4 is disconnected from port 24*b*. Ports 24*a* and 24*b* are connected to respective inputs of phase shifter 18. Switch 24 may be an electronically controlled double pole, double throw switch, or the like, with the type of signal provided to its input from timing control circuitry 20 being compatible to effectuate desired control of the switching of switch 24.

Upon receipt of the control signal from circuitry 20, state selector 22 provides signals from its outputs to phase shifter 18 through switch 24 which cause phase shifter 18 to step sequentially through its range of possible phase shifts. State selector 22 may be preprogrammed to commence in response to the synch signal the phase-step process and to provide the appropriate signals to phase shifter 18, which are typically digital in nature, so that for the configuration shown, the logical value of the signal pairs may be represented by 0,0; 0,1; 1,0 and 1,1 for exercising the four possible states of two-bit phase shifter 18.

Phase shifter 18 may also include a device responsive to analog signals with appropriate modifications to the circuitry for supplying the control signals as is apparent to one familiar with the art. Also signal-to-noise ratio instead of power may be used to determine the appropriate phase settings of phase shifter 18.

At each phase selected by the output signals from state selector circuitry 22, and as identified by the signals provided to inputs A and B of MUX 26, a value indicative of the magnitude of the signal from output 28*b* of peak detector 28 will be provided through MUX 26 to a track and hold, or sample and hold, device 51, 53, 55 and 57 corresponding to phases 0°, 90°, 180° and 270°, respectively, for a four-bit phase shifter 18. Two lines are shown from respective outputs of MUX 26 to each of devices 51, 53, 55 and 57. One such line represents the connection for supplying the value indicative of the magnitude of the signal from peak detector 28 while the other line represents a connection for supplying a control or transfer signal for activating devices 51, 53, 55 and 57, respectively. Other components which may employ a strobe signal may be substituted for devices 51, 53, 55 and 57 as will be appreciated by those familiar with the art.

Each output of device 51, 53, 55 and 57 is connected to an input of three different comparators 81–86, wherein the dash (–) in the expression 81–86 is read to mean "through and including". The actual connections between outputs of devices 51, 53, 55 and 57 and comparators 81–86 are made so that all possible combinations of n items taken r at a time are made. In shorthand this may be represented generically ${}_nc_r$ wherein $$_nc_r = \frac{n!}{r!(n-r)!}$$

the factorial of the number. Thus for the example shown in FIG. 1, n=4 (four phases) and r=2 (two items compared at a time). The value of $_4C_2$ is then $$\frac{4!}{2!(4-2)!} \text{ or } 6.$$

An ultimate goal of the invention is to determine at which phase setting of phase shifter 18 the energy monitored by peak detector 28, and therefore the received energy to be provided to transceiver 12 at a maximum. Accordingly, for the scheme shown the connections between devices 51, 53, 55 and 57 and comparators 81–86 are arranged so that the representative signal value available at each output of devices 51, 53, 55 and 57 is compared with the representative signal value available at the output of each of the other devices 51, 53, 55 and 57.

Table look-up circuitry 100, which may include for example a preprogrammed programmable read only memory (PROM), is accessed by the value of outputs of comparators 81–86 which may be considered collectively to form an address. For a six-bit binary address, sixty-four ($2^6$) different values are possible. For each possible address, a corresponding value of a phase control 1 signal and a phase control 2 signal is available and transferred to the corresponding output 100*a* and 100*b* of table look-up 100 when the control signal available from timing control circuitry 20 and provided to input 100*c* of table look-up 100 indicates that such transfer is appropriate. That is, such transfer is made after all comparisons have been performed by comparators 81–86.

Contemporaneously with, or shortly after table look-up 100 transfers signal values to outputs 100*a* and 100*b*, timing control circuitry 20 perturbates the mode selection signal supplied to the input of switch 24 which causes switch 24 to connect terminal 3 to port 24*a* and terminal 4 to port 24*b* while disconnecting terminal 1 and 2 from ports 24*a* and 24*b*, respectively. Also switch 14 is commanded by timing control circuitry 20 to connect port 14*b* with port 14*a* while disconnecting port 14*b* and 14*c*. These actions return the system to the normal transmit/receive mode. The values of the signals at outputs 100*a* and 100*b* which are supplied to phase shifter 18 through switch 24 are used during the normal transmit/receive mode until another tone is detected by tone detect circuitry 15 at which time the process for determining which phase setting for phase shifter 18 provides the maximum received energy signal at input 28*a* of peak detector 28 is repeated.

The functions of table look-up circuitry 100 may also be realized by using a logic circuit such as may be implemented with integrated circuit, VLSI or application specific integrated circuit (ASIC) technology as is readily apparent to one familiar with the art.

Repetition of the determination of the beneficial phase setting of phase shifter 18 for receipt of maximum usable energy at transceiver 12 is dependent on the rate of recurrence of the tone from the remote station, or other indicia of testing cycle initiation. In a typical satellite based communication system, such rate of recurrence would be determined by the overall system operator or designer and would generally be transmitted automatically during a communication session, or be predeterminedly programmed into the overall communication scheme being used, without requiring external operator intervention. Of course, operator selectable initiation and performance of appropriate phase settings may be provided, if desired.

It is expected that a tone transmitted for an interval of about 10 to about 100 microseconds and repeated about 10 to about 100 times per second would provide adequate opportunity to adjust phase settings for phase shifter 18 for obtaining quality reception without imposing undue overhead, or detrimentally limiting time during which normal transmit/receive communication operations could be conducted, on the communication system. To the extent that a shorter time interval and/or a shorter repetition period proves effective, in other words a reduction in the duty cycle of determination of phase settings is obtainable, while still permitting accurate determination of the phase settings, then more time is available for actual communication and/or, if desired, the determination of phase settings may be repeated more often without decreasing the time available for actual communication.

Appropriate setting of the phase shift between the input and output of phase shifter 18 reduces the effects of multipath fading when communicating in both the transmit and receive mode with a remote station. Multipath fading degrades the quality of communication. Fading occurs when a signal reaches the receiver via a direct path as well as over one or more indirect paths such as may arise from surfaces, including the earth, scattering the signal. The direct and reflected waves interfere with each other and either add (reinforce) or subtract (cancel) each other depending on their relative phase with respect to each other. Phase shifter 18 having a phase shift from its input to its output established in accordance with the teachings of presented herein maximizes the received signal power, or the signal-to-noise ratio, supplied to receiver 12, resulting in improved performance as is recognized by one familiar with the art.

One benefit of achieving higher input power to receiver 12 is that the remote station antenna may be smaller. Where the remote station includes a satellite, reduced antenna size and corresponding weight reduction will permit the overall satellite to be reduced in weight, thus reducing thrust requirements for placing the payload and satellite in orbit, and/or additional equipment may be included on or with the satellite while still maintaining the payload to be lifted into orbit at the same or lesser weight than required by other communication systems.

Figure 2:
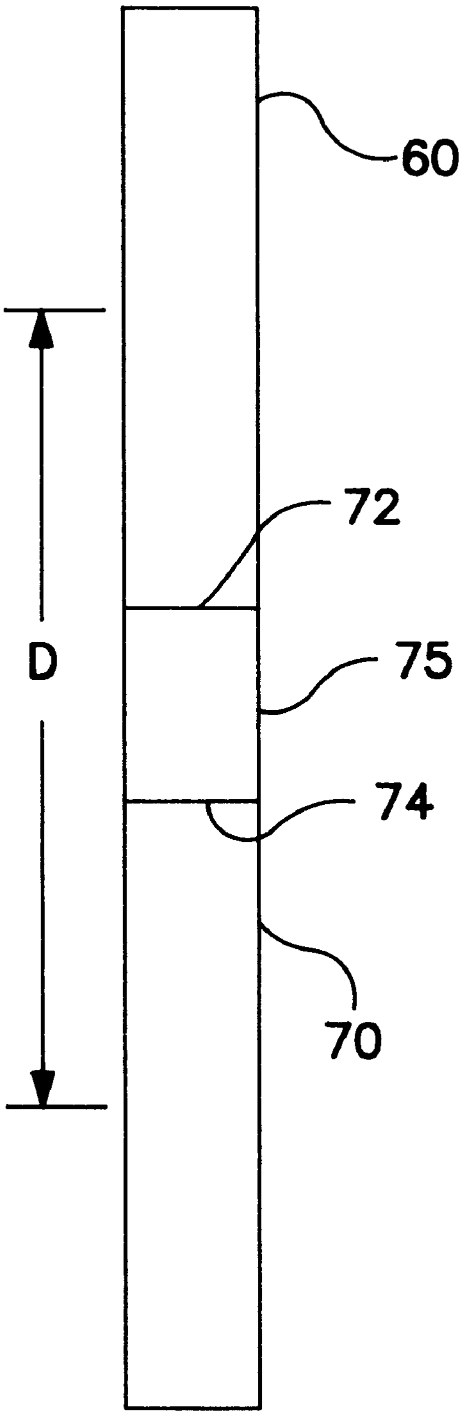
FIG. 2 is an elevational plan view of a pair of in accordance with the present invention.

Referring to FIG. 2 a schematic representation of an antenna systsem in accordance with the present invention is shown.

Antenna 60 and 70 may be of the same type and have the same or similar frequency response characteristics. However, the present invention is not so limited and thus different type antennas and/or antennas having different frequency response characteristics may be used, if desired. In a presently preferred embodiment, antenna 60 and 70 are each an elongated cylindrical quadrifilar helix antenna such as may be fabriacted by one familiar with the art in accordance with the teachings, for example, of articles "Resonant Quadrifilar Helix Design"—C. C. Kilgus, Microwave Journal (December 1970) and "Spacecraft and Ground Station Applications of the Resonant Quadrifilar Helix"—C. C. Kilgus, Digest of the International Symposium of Antennas and Propagation (1974) or the like, which broadcasts and receives in a generally omnidirectional pattern. One or more directional antennas having a predetermined defined elevation and azimuthal patterns may also be used if desired. Antennas 60 and 70 are shown stacked one on the other so that their longitudinal axes are substantially parallel and, more particularly, will generally be colinear, with a support or spacer 75 disposed between proximate ends of antennas 60 and 72. Support 75 may include any non-electromagnetic conducting, or insulating or dielectric, material such as wood, plastic, ceramic or foam based material. Support 75 is shown fabricated or configured to have the same outer contour, such as cylindrical or other shape having a smooth or gradually curving surface (which may be represented by circular, ellipsoidal, or other smooth profile or a gradually changing profile in cross-section transverse the longitudinal axis thereof) as antenna 60 and 70, and may be connected at its respective longitudinal ends 72 and 74 to an end of antenna 60 and 70 by bonding, such as with epoxy, or the like, for maintaining a fixed relationship between antenna 60 and 70. The length, or longitudinal extent, of spacer 75 between end 72 and 74 may be selected so that when antenna 72 and 74 are operationally assembled, the spacing D between the longitudinal mid-points of antenna 72 and antenna 74 attains a predetermined value. The desired value of spacing D may be determined in response to the nominal or carrier frequency transmitted to the remote station, or uplink frequency, and/or the nominal or carrier frequency transmitted from the remote station, or downlink frequency. In general, spacing D should be equal to or less than one wavelength $\lambda_o$ in air of the higher of the uplink or downlink frequencies in order to avoid grating lobes. The wavelength $\lambda_o$ in air of the higher of the uplink or downlink frequencies will be referred to herein as the critical wavelength. It is believed that for most practical applications the value of spacing D should be selected to lie between about 100% and about 50%, and preferably between about 60% and about 80% of the critical wavelength. Alternatively, antenna 60 and antenna 70 may be separate from each other or disposed, or wound around a single central rod or mandrel so that use of support 75 is not required.

Referring to FIG. 3, a simplified pictorial diagram not necessarily to scale and useful for explaining operational features of the present invention is shown.

Transmit/receive system 10 is shown contained in a portable hand-held unit. Operator 140 accesses system 10 to select operational modes for transmitting and receiving by system 10. A remote station 150, which may be on a satellite, receives directly a portion 160*a* of electromagnetic energy 160 transmitted from system 10. Likewise system 10 may receive directly a portion 170*a* of electromagnetic energy 170 transmitted from station 150.

Individual 140 is shown standing on ground 180 which for ease of explanation is illustrated as being flat. A portion of energy 170 from system 150 may also proceed along path 170*c* to strike the ground at point 180*a* with a portion of energy from along path 170*c* reflected from ground 180 at point 180*a* proceeding along path 170*d*, so that ultimately at least a part of energy from along path 170*d* is received by system 10. Point 180*a* may be considered as an apparent source of energy for ease of analysis. Depending on the magnitude, polarization and phasing of the energy received by system 10 from path 170*a* and path 170*d*, it is theoretically possible that the energy level available at ports 36*c* and 38*c* (FIG. 1) will be the sum of the magnitudes, the difference in these magnitudes or some value between such sum and difference. Of course, reflection of energy from station 150 off other objects to be received by system 10 is also possible, so that system 10 may receive energy from a plurality of paths or apparent source.

An analogous bounce or reflection route is also possible for energy transmission from system 10 to remote station 150. That is, energy from system 10 may strike the ground or other objects and be reflected so that at least a portion thereof is received by station 150.

The combination of tone detect circuitry 15, peak detector 28, timing control circuitry 20 switch 14, state selector circuitry 22, switch 24, MUX 26 and table look-up 100 is generally useful and functional for determining the phase setting for phase shifter 18 that provides maximum received power to peak detector 28 and ultimately to transceiver 12. Benefits of the present invention are achieved at least in part by minimizing electromagnetic multi-path effects, such as fading, in both the transmit and receive operation. However, the invention is not limited to the embodiment described. For example, different components may be substituted for those disclosed, such as conditional if-then logic circuitry for table look-up 100, or an entire functionally equivalent system which does not necessarily include a one-to-one component to component correspondence for ultimately obtaining such setting, or its equivalent, may be employed as is readily recognizable to one familiar with the art.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A transceiver comprising:

transmitter means having an output, the transmitter for supplying a first electromagnetic energy signal available at the output of the transmitter;

receiver means having an input, the receiver for obtaining communication information associated with a second electromagnetic energy signal;

first antenna means having a port, the first antenna means for intercepting a first portion of the second electromagnetic energy signal for forming a first receive signal, the first receive signal available at the port of the first antenna means, and the first antenna means further for broadcasting a first portion of the first electromagnetic energy signal;

phase shifting means having a first and a second port and an input;

phase control means having an input and an output, the output connected to the input of the phase shifting means;

second antenna means having a port connected to the first port of the phase shifting means, the second antenna means for intercepting a second portion of the second electromagnetic energy signal for forming a second receive signal, the second receive signal available at the port of the second antenna means, and the second antenna means further for broadcasting a second portion of the first electromagnetic energy signal, wherein the phase shifting means for applying a first predetermined phase shift to the second receive signal for forming a phase-shifted receive signal, the phase shifted receive signal available at the second port of the phase-shifting means; and combiner/divider means having a first, second and third port, the first port connected to the port of the first antenna means, the second port connected to the second port of the phase shifting means and the third port connected to the output of transmitter and to the input of the receiver, the combiner/divider means in a first mode of operation for directing a first part of electromagnetic energy available at the third port to the first port and a second part of electromagnetic energy available at the third port to the second port and in a second mode of operation for combining electromagnetic energy available at the first port and the second port for forming a combined electromagnetic energy signal available at the third port, wherein the input of the phase control means connected to the third port of the combiner/divider means, the phase control means for generating a phase control signal in response to the magnitude of the combined electromagnetic energy signal, the phase control signal supplied to the input of the phase shifting means and further wherein the first predetermined phase shift in response to the phase control signal.

2. The transceiver as in claim 1, wherein the phase control means further includes peak detector means having an input connected to the third port of the combiner/divider means, the peak detector means for generating a peak detect signal indicative of the magnitude of the combined electromagnetic energy signal available at the third port of the combiner/divider means, wherein the magnitude of the combined electromagnetic energy signal may be maximized in response to the phase control signal.

3. The transceiver as in claim 2, wherein the phase control means further includes state selector means having an output connected to the input of the phase shifting means, the state selector means for commanding application of each of a plurality of second predetermined phase shifts in a predetermined sequence, wherein the one of the plurality of second predetermined phase shifts obtaining a maximum combined electromagnetic energy signal is selected as the first predetermined phase shift.

4. A method for combating multipath fading in a communication system, comprising the steps of:

receiving and transmitting signals via first and second paths and separate respective antennas;

shifting the phase of the signal in the second signal paths relative to the signal in the first path by a fixed amount during transmitting and receiving;

combining the received signals from the first and second path into a combined signal;

detecting whether the combined signal includes a predetermined tone; and adjusting the fixed amount of phase shift if the predetermined tone is detected.

5. The method according to claim 4, whererin the adjusting comprises the steps of:

initiating at least one change in the fixed amount of phase shift in response to detecting the predetermined tone; and setting the fixed amount of phase shift in the shifting step based on characteristics of the combined signal during the at least one change.

6. The method according to claim 5, wherein:

the fixed amount of phase shift is set to the fixed amount of phase shift at which the combined signal has the maximum value.

7. The method according to claim 5, wherein:

the fixed amount of phase shift is set to the fixed amount of phase shift at which the combined signal has the lowest signal to noise ratio.

8. A transceiving system for ameliorating multipath fading, comprising:

a transceiver;

first and second antennas coupled to first and second signal paths for receiving and transmitting signals;

a combiner/divider coupled to the transceiver for dividing signals transmitted from the transceiver into the first and second signal paths and for combining signals received from the first and second signal paths into a combined signal for the transceiver;

a phase shifter disposed in the second signal path for shifting a phase of signals in the second signal path a fixed amount relative to signals in the first signal path;

a detector coupled to the transceiver for detecting whether the combined signal includes a predetermined tone;

a control unit connected to the detector and the phase shifter for adjusting the fixed amount of phase shift once the predetermined tone is detected.

9. The transceiver according to claim 8, further comprising:

a state selector coupled to the control unit and the phase shifter, the state selector selecting at least one fixed amount of phase shift in response to the detector detecting the predetermined tone;

a second detector coupled to the combiner/divider, the second detector detecting a characteristic of the combined signal at each selected fixed amount of phase shift; and a storage table coupled to the second detector, the state selector and the phase shifter for storing and setting the fixed amount of phase shift based on the characteristic of the combined signal during the at least one phase shift selection.

10. The transceiver according to claim 9, wherein:

the second detector is a maximum detector and the fixed amount of phase shift is set to the fixed amount of phase shift at which the combined signal has the maximum value.

11. The transceiver according to claim 9, wherein:

the second detector is a signal to noise detector and the fixed amount of phase shift is set to the fixed amount of phase shift at which the combined signal has the lowest signal to noise ratio.

* * * * *